United States Patent
Bosch et al.

(10) Patent No.: US 10,417,025 B2
(45) Date of Patent: Sep. 17, 2019

(54) SYSTEM AND METHOD TO CHAIN DISTRIBUTED APPLICATIONS IN A NETWORK ENVIRONMENT

(71) Applicant: CISCO TECHNOLOGY, INC., San Jose, CA (US)

(72) Inventors: Hendrikus G. P. Bosch, Aalsmeer (NL); Louis Gwyn Samuel, Swindon (GB); Kevin D. Shatzkamer, Hingham, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 87 days.

(21) Appl. No.: 14/684,363

(22) Filed: Apr. 11, 2015

(65) Prior Publication Data
US 2016/0139939 A1 May 19, 2016

Related U.S. Application Data

(60) Provisional application No. 62/081,457, filed on Nov. 18, 2014.

(51) Int. Cl.
*H04L 12/70* (2013.01)
*G06F 9/455* (2018.01)
(Continued)

(52) U.S. Cl.
CPC ...... *G06F 9/45508* (2013.01); *G06F 9/45558* (2013.01); *H04L 67/10* (2013.01);
(Continued)

(58) Field of Classification Search
None
See application file for complete search history.

(56) References Cited

U.S. PATENT DOCUMENTS

| 3,629,512 A | 12/1971 | Yuan |
| 4,769,811 A | 9/1988 | Eckberg et al. |

(Continued)

FOREIGN PATENT DOCUMENTS

| CN | 103716123 | 4/2014 |
| CN | 103716137 | 4/2014 |

(Continued)

OTHER PUBLICATIONS

Hongyu Li "Service Function Chaining Use Cases", IETF 88 Vancouver, Nov. 7, 2013.*

(Continued)

*Primary Examiner* — Andy Ho
*Assistant Examiner* — Abdou K Seye
(74) *Attorney, Agent, or Firm* — Cisco Technology, Inc.

(57) ABSTRACT

A method is provided in one example embodiment and may include communicating information between a plurality of network function virtualized (NFV) based applications; and creating at least one service chain using at least two of the plurality of NFV-based applications based on the information communicated between the plurality NFV based applications. In some instances, the information can be communicated using border gateway protocol (BGP) exchanges between the NFV-based applications. In some instances, the information can include at least one of: next-hop address information for one or more ingress points of a particular NFV-based application; one or more capabilities by which a particular NFV-based application can receive data on one or more ingress points; and a method by which one or more egress points of a previous NFV-based application in a particular service chain is to perform load balancing for a subsequent NFV-based application in the particular service chain.

19 Claims, 4 Drawing Sheets

(51) Int. Cl.
*H04L 29/08* (2006.01)
*H04W 4/60* (2018.01)
(52) U.S. Cl.
CPC .............. *H04L 67/16* (2013.01); *H04W 4/60* (2018.02); *G06F 2009/4557* (2013.01); *G06F 2009/45595* (2013.01)

(56) References Cited

U.S. PATENT DOCUMENTS

| | | |
|---|---|---|
| 5,408,231 A | 4/1995 | Bowdon |
| 5,491,690 A | 2/1996 | Alfonsi et al. |
| 5,557,609 A | 9/1996 | Shobatake et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | McFarland |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas |
| 7,231,462 B2 | 6/2007 | Bethaud et al. |
| 7,333,990 B1 | 2/2008 | Thiagarajan |
| 7,443,796 B1 | 10/2008 | Albert et al. |
| 7,458,084 B2 | 11/2008 | Zhang et al. |
| 7,486,622 B2 | 2/2009 | Regan et al. |
| 7,536,396 B2 | 5/2009 | Johnson et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad |
| 7,610,375 B2 | 10/2009 | Portolani et al. |
| 7,643,468 B1 | 1/2010 | Arregoces et al. |
| 7,644,182 B2 | 1/2010 | Banerjee |
| 7,647,422 B2 | 1/2010 | Singh et al. |
| 7,657,898 B2 | 2/2010 | Sadiq |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,814,284 B1 | 10/2010 | Glass et al. |
| 7,831,693 B2 | 11/2010 | Lai |
| 7,852,785 B2 | 12/2010 | Lund et al. |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda |
| 8,095,683 B2 | 1/2012 | Balasubramanian Chandra Sekar |
| 8,116,307 B1 | 2/2012 | Thesayi et al. |
| 8,166,465 B2 | 4/2012 | Feblowitz et al. |
| 8,180,909 B2 | 5/2012 | Hartman et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,442,043 B2 | 5/2013 | Sharma et al. |
| 8,451,817 B2 | 5/2013 | Cheriton |
| 8,464,336 B2 | 6/2013 | Wei et al. |
| 8,520,672 B2 | 8/2013 | Guichard et al. |
| 8,601,152 B1 | 12/2013 | Chou |
| 8,605,588 B2 | 12/2013 | Sankaran et al. |
| 8,612,612 B1 | 12/2013 | Dukes et al. |
| 8,645,952 B2 | 2/2014 | Biswas et al. |
| 8,700,892 B2 | 4/2014 | Bollay |
| 8,724,466 B2 | 5/2014 | Kenigsberg et al. |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian |
| 8,792,490 B2 | 7/2014 | Jabr et al. |
| 8,793,400 B2 | 7/2014 | McDysan |
| 8,812,730 B2 | 8/2014 | Vos et al. |
| 8,825,070 B2 | 9/2014 | Akhtar et al. |
| 8,830,334 B2 | 9/2014 | Sharma et al. |
| 8,904,037 B2 | 12/2014 | Haggar et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | McDysan |
| 9,178,812 B2 | 11/2015 | Guichard et al. |
| 9,189,285 B2 | 11/2015 | Ng et al. |
| 9,203,711 B2 | 12/2015 | Agarwal et al. |
| 9,253,274 B2 | 2/2016 | Quinn et al. |
| 9,300,585 B2 | 3/2016 | Kumar et al. |
| 9,311,130 B2 | 4/2016 | Christenson et al. |
| 9,319,324 B2 | 4/2016 | Beheshti-Zavareh et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,398,486 B2 | 7/2016 | La Roche, Jr. et al. |
| 9,413,655 B2 | 8/2016 | La Roche, Jr. et al. |
| 9,424,065 B2 | 8/2016 | Singh et al. |
| 9,473,570 B2 | 10/2016 | Bhanujan et al. |
| 9,479,443 B2 | 10/2016 | Bosch et al. |
| 9,571,405 B2 | 2/2017 | Pignataro et al. |
| 9,660,909 B2 | 5/2017 | Guichard et al. |
| 9,774,533 B2 | 9/2017 | Zhang et al. |
| 9,882,776 B2 | 1/2018 | Aybay et al. |
| 2001/0023442 A1 | 9/2001 | Masters |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |
| 2003/0088698 A1 | 5/2003 | Singh et al. |
| 2003/0110081 A1 | 6/2003 | Tosaki |
| 2003/0120816 A1 | 6/2003 | Berthaud et al. |
| 2003/0226142 A1 | 12/2003 | Rand |
| 2004/0109412 A1 | 6/2004 | Hansson |
| 2004/0199812 A1 | 10/2004 | Earl et al. |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0086367 A1 | 4/2005 | Conta et al. |
| 2005/0152378 A1 | 7/2005 | Bango et al. |
| 2005/0160180 A1 | 7/2005 | Rabje et al. |
| 2005/0204042 A1 | 9/2005 | Banerjee |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | McFarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |

(56) References Cited

U.S. PATENT DOCUMENTS

| | | |
|---|---|---|
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn |
| 2008/0181118 A1 | 7/2008 | Sharma |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0204612 A1 | 8/2009 | Keshavarz-Nia et al. |
| 2009/0271656 A1 | 10/2009 | Yokota et al. |
| 2009/0300207 A1 | 12/2009 | Giaretta |
| 2009/0300407 A1 | 12/2009 | Kamath et al. |
| 2009/0305699 A1 | 12/2009 | Deshpande |
| 2009/0328054 A1 | 12/2009 | Paramasivam et al. |
| 2010/0054260 A1 | 3/2010 | Pandey et al. |
| 2010/0058329 A1 | 3/2010 | Durazzo et al. |
| 2010/0063988 A1 | 3/2010 | Khalid |
| 2010/0080226 A1 | 4/2010 | Khalid et al. |
| 2010/0165985 A1 | 7/2010 | Sharma et al. |
| 2010/0214949 A1 | 8/2010 | Smith et al. |
| 2010/0254385 A1 | 10/2010 | Sharma et al. |
| 2010/0318784 A1 | 12/2010 | Rao et al. |
| 2011/0023090 A1 | 1/2011 | Asati et al. |
| 2011/0032833 A1* | 2/2011 | Zhang .............. H04L 45/70 370/252 |
| 2011/0055845 A1* | 3/2011 | Nandagopal ........ H04L 67/1023 718/105 |
| 2011/0131338 A1 | 6/2011 | Hu |
| 2011/0142056 A1 | 6/2011 | Manoj |
| 2011/0161494 A1* | 6/2011 | McDysan .......... H04L 45/306 709/225 |
| 2011/0167471 A1 | 7/2011 | Riley et al. |
| 2011/0184807 A1 | 7/2011 | Wang et al. |
| 2011/0235508 A1 | 9/2011 | Goel |
| 2011/0246899 A1 | 10/2011 | Kwon et al. |
| 2011/0255538 A1 | 10/2011 | Srinivasan |
| 2011/0264905 A1 | 10/2011 | Ovsiannikov |
| 2011/0267947 A1* | 11/2011 | Dhar ................. H04L 47/125 370/235 |
| 2011/0320580 A1 | 12/2011 | Zhou |
| 2012/0030365 A1 | 2/2012 | Lidstrom et al. |
| 2012/0087262 A1 | 4/2012 | Rasanen |
| 2012/0131662 A1 | 5/2012 | Kuik |
| 2012/0185853 A1 | 7/2012 | Haviv et al. |
| 2012/0207174 A1* | 8/2012 | Shieh ................ H04L 47/125 370/401 |
| 2012/0278804 A1 | 11/2012 | Narayanasamy et al. |
| 2012/0281540 A1 | 11/2012 | Khan |
| 2012/0281544 A1 | 11/2012 | Anepu |
| 2012/0327767 A1 | 12/2012 | Ramakrishnan |
| 2012/0327947 A1 | 12/2012 | Cai |
| 2012/0331135 A1 | 12/2012 | Alon et al. |
| 2013/0003735 A1 | 1/2013 | Chao et al. |
| 2013/0003736 A1* | 1/2013 | Szyszko ............ H04L 47/2441 370/392 |
| 2013/0031271 A1 | 1/2013 | Bosch et al. |
| 2013/0040640 A1 | 2/2013 | Chen et al. |
| 2013/0044636 A1 | 2/2013 | Koponen |
| 2013/0086236 A1 | 4/2013 | Baucke et al. |
| 2013/0097323 A1 | 4/2013 | Barsness et al. |
| 2013/0121137 A1 | 5/2013 | Feng et al. |
| 2013/0121207 A1 | 5/2013 | Parker |
| 2013/0124708 A1 | 5/2013 | Lee |
| 2013/0125124 A1 | 5/2013 | Kempf et al. |
| 2013/0155902 A1 | 6/2013 | Feng et al. |
| 2013/0163594 A1 | 6/2013 | Sharma |
| 2013/0163606 A1 | 6/2013 | Bagepalli et al. |
| 2013/0188554 A1 | 7/2013 | Cai |
| 2013/0198412 A1 | 8/2013 | Saito |
| 2013/0215215 A1 | 8/2013 | Gage et al. |
| 2013/0215888 A1 | 8/2013 | Zhang et al. |
| 2013/0223290 A1 | 8/2013 | Zhou |
| 2013/0223449 A1 | 8/2013 | Koganti et al. |
| 2013/0235874 A1 | 9/2013 | Ringdahl et al. |
| 2013/0238774 A1 | 9/2013 | Davison et al. |
| 2013/0238806 A1 | 9/2013 | Moen |
| 2013/0272305 A1 | 10/2013 | Lefebvre et al. |
| 2013/0279503 A1 | 10/2013 | Chiabaut |
| 2013/0311675 A1 | 11/2013 | Kancherla |
| 2013/0329584 A1 | 12/2013 | Ghose |
| 2014/0010083 A1 | 1/2014 | Hamdi et al. |
| 2014/0010084 A1 | 1/2014 | Kavunder et al. |
| 2014/0010085 A1 | 1/2014 | Kavunder et al. |
| 2014/0010096 A1 | 1/2014 | Kamble et al. |
| 2014/0036730 A1 | 2/2014 | Nellikar |
| 2014/0050223 A1 | 2/2014 | Foo et al. |
| 2014/0059544 A1 | 2/2014 | Koganty et al. |
| 2014/0067758 A1 | 3/2014 | Boldyrev et al. |
| 2014/0079070 A1 | 3/2014 | Sonoda et al. |
| 2014/0115062 A1 | 4/2014 | McDysan |
| 2014/0119367 A1 | 5/2014 | Han |
| 2014/0169215 A1 | 6/2014 | Rajendran et al. |
| 2014/0169375 A1 | 6/2014 | Khan et al. |
| 2014/0181267 A1* | 6/2014 | Wadkins ............. H04L 69/163 709/219 |
| 2014/0188676 A1 | 7/2014 | Marmolejo-Meillon et al. |
| 2014/0201374 A1 | 7/2014 | Ashwood-Smith et al. |
| 2014/0241247 A1 | 8/2014 | Kempf et al. |
| 2014/0254603 A1 | 9/2014 | Banavalikar |
| 2014/0259012 A1* | 9/2014 | Nandlall ............. H04W 4/003 718/1 |
| 2014/0279863 A1 | 9/2014 | Krishnamurthy |
| 2014/0280836 A1 | 9/2014 | Kumar et al. |
| 2014/0280950 A1 | 9/2014 | Bhanujan et al. |
| 2014/0304412 A1 | 10/2014 | Prakash et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard |
| 2014/0334488 A1 | 11/2014 | Guichard et al. |
| 2014/0344439 A1 | 11/2014 | Kempf et al. |
| 2014/0351452 A1 | 11/2014 | Bosch et al. |
| 2014/0362682 A1 | 12/2014 | Guichard et al. |
| 2014/0362857 A1 | 12/2014 | Guichard |
| 2014/0372617 A1 | 12/2014 | Houyou et al. |
| 2014/0379938 A1 | 12/2014 | Bosch et al. |
| 2015/0003455 A1 | 1/2015 | Haddad et al. |
| 2015/0012988 A1 | 1/2015 | Jeng et al. |
| 2015/0026362 A1 | 1/2015 | Guichard |
| 2015/0032871 A1 | 1/2015 | Allan et al. |
| 2015/0052516 A1 | 2/2015 | French |
| 2015/0063102 A1 | 3/2015 | Mestery et al. |
| 2015/0063166 A1 | 3/2015 | Sif et al. |
| 2015/0071285 A1 | 3/2015 | Kumar et al. |
| 2015/0074276 A1 | 3/2015 | DeCusatis |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092551 A1* | 4/2015 | Moisand ............. H04L 12/4633 370/235 |
| 2015/0106624 A1 | 4/2015 | Gero |
| 2015/0117308 A1* | 4/2015 | Kant ................. H04W 40/12 370/328 |
| 2015/0120890 A1 | 4/2015 | Ghai |
| 2015/0124622 A1 | 5/2015 | Kovvali et al. |
| 2015/0131484 A1 | 5/2015 | Aldrin |
| 2015/0131660 A1 | 5/2015 | Shepherd et al. |
| 2015/0137973 A1 | 5/2015 | Kumar et al. |

(56) References Cited

U.S. PATENT DOCUMENTS

| | | | |
|---|---|---|---|
| 2015/0156035 | A1 | 6/2015 | Foo et al. |
| 2015/0172170 | A1 | 6/2015 | Bosch et al. |
| 2015/0180725 | A1 | 6/2015 | Varney et al. |
| 2015/0180767 | A1 | 6/2015 | Tam et al. |
| 2015/0181309 | A1 | 6/2015 | Shepherd et al. |
| 2015/0188949 | A1 | 7/2015 | Mahaffey et al. |
| 2015/0195197 | A1 | 7/2015 | Yong |
| 2015/0215172 | A1 | 7/2015 | Kumar |
| 2015/0222516 | A1 | 8/2015 | Deval |
| 2015/0236948 | A1 | 8/2015 | Dunbar |
| 2015/0263901 | A1 | 9/2015 | Kumar et al. |
| 2015/0271102 | A1 | 9/2015 | Antich |
| 2015/0271203 | A1 | 9/2015 | Duminuco et al. |
| 2015/0271204 | A1 | 9/2015 | Duminuco et al. |
| 2015/0271205 | A1 | 9/2015 | Duminuco et al. |
| 2015/0282177 | A1 | 10/2015 | Dong |
| 2015/0312801 | A1 | 10/2015 | Khan et al. |
| 2015/0333930 | A1 | 11/2015 | Aysola |
| 2015/0334027 | A1 | 11/2015 | Bosch et al. |
| 2015/0334595 | A1 | 11/2015 | Bosch et al. |
| 2015/0365322 | A1 | 12/2015 | Shatzkamer et al. |
| 2016/0028604 | A1 | 1/2016 | Chakrabarti et al. |
| 2016/0043952 | A1 | 2/2016 | Zhang et al. |
| 2016/0050132 | A1 | 2/2016 | Zhang |
| 2016/0099853 | A1 | 4/2016 | Nedeltchev et al. |
| 2016/0119159 | A1 | 4/2016 | Zhao et al. |
| 2016/0134518 | A1 | 5/2016 | Callon et al. |
| 2016/0134535 | A1 | 5/2016 | Callon |
| 2016/0164776 | A1 | 6/2016 | Biancaniello |
| 2016/0173373 | A1 | 6/2016 | Guichard et al. |
| 2016/0182336 | A1 | 6/2016 | Doctor et al. |
| 2016/0182342 | A1 | 6/2016 | Singaravelu et al. |
| 2016/0226742 | A1 | 8/2016 | Apathotharanan |
| 2016/0248685 | A1 | 8/2016 | Pignataro et al. |
| 2016/0285720 | A1 | 9/2016 | Maenpaa |
| 2016/0323165 | A1 | 11/2016 | Boucadair et al. |
| 2017/0250917 | A1 | 8/2017 | Ruckstuhl et al. |
| 2018/0026884 | A1 | 1/2018 | Nainar et al. |

FOREIGN PATENT DOCUMENTS

| | | |
|---|---|---|
| CN | 104137482 A | 11/2014 |
| CN | 105098809 | 11/2015 |
| CN | 105099751 | 11/2015 |
| EP | 2122483 | 7/2008 |
| EP | 2073449 | 6/2009 |
| EP | 2791802 | 6/2013 |
| EP | 2945329 | 11/2015 |
| JP | 2016149686 | 8/2016 |
| WO | WO2005/104650 | 11/2005 |
| WO | WO2008/063858 | 5/2008 |
| WO | WO 2008/088954 | 7/2008 |
| WO | WO2011/012165 | 2/2011 |
| WO | WO 2012/056404 | 5/2012 |
| WO | WO2013/101765 | 4/2013 |
| WO | WO2013/090035 | 6/2013 |
| WO | WO2013/095714 | 6/2013 |
| WO | WO 2014/176989 A1 | 11/2014 |
| WO | WO2014/189670 | 11/2014 |
| WO | WO2015/073190 | 5/2015 |
| WO | WO2015/088557 | 6/2015 |
| WO | WO2015/094567 | 6/2015 |
| WO | WO2016/081379 | 5/2016 |

OTHER PUBLICATIONS

Ying Zhang et al. "StEERING: A Software-Defined Networking for Inline Service Chaining", 2013, 978-1-4799-1270-4/13/$31.00 © 2013 IEEE, p. 1-10.*

Kim-Khoa Nguyen et al. "Distributed Control Plane Architecture of Next Generation IP Routers", 2009, 978-1-4244-5012-1/09/$25.00 © 2009 IEEE, p. 1-8.*

Fernando, et al., "Virtual Service Topologies in BGP VPNs," Internet Engineering Task Force (IETF) Internet-Draft, draft-rfernando-virt-topo-bgp-vpn-01, Oct. 22, 2012, 11 pages.

Haeffner, W., "Service Function Chaining Use Cases in Mobile Networks," Service Function Chaining Internet Draft draft-ietf-afc-use-case-mobility-03, Jan. 13, 2015; 25 pages.

Kiehle, Christian, et al., "Standardized Geoprocessing—Taking Spatial Data Infrastructures One Step Further", 9th Agile International Conference on Geographic Information Science, Apr. 22, 2006, 10 pages.

Ladner, Roy, et al., "Case-Based Classification Alternatives to Ontologies for Automated Web Service Discovery and Integration" proceedings of the SPIE—The International Society for Optical Engineering, Apr. 17, 2006, 8 pages.

Lemmens, Rob, et al., "Semantic and Syntactic Service Descriptions at Work in Geo-service Chaining", 9th Agile International Conference on Geographic Information Science, Apr. 20, 2006, 11 pages.

McKeown, et al., "OpenFiow: Enabling Innovation in Campus Networks," ACM SIGCOMM Computer Communication Review, vol. 38, No. 2, Apr. 2008, 6 pages.

Quinn, P., et al., "Network Services Header," Network Working Group Internet Draft draft-quinn-sfc-nsh-07.txt, Feb. 24, 2015; 43 pages.

Singh, Sumeet et al., Service Portability: Why HTTP redirect is the model for the future [on line], Nov. 2006 [retrieved on Sep. 8, 2009], retrieved from the Internet: URL:http://conferences.sigcomm.org/hotnets/2006/singh06service.pdf, 6 pages.

Bitar, N., et al., "Interface to the Routing System (I2RS) for Service Chaining: Use Cases and Requirements," Internet Engineering Task Force, draft-bitar-i2rs-service-chaining-01; Feb. 14, 2014; 15 pages.

"Comparison between OS virtualization and hypervisor-based virtualization," Servernest, Feb. 4, 2015, Copyright © 2009-2011 by ServerNest GmbH, 2 pages.

Carpenter, B., et al., "Using the IPv6 Flow Label for Equal Cost Multipath Routing and Link Aggregation in Tunnels," Network Working Group, RFC 6438, Nov. 2011, 9 pages; http://www.hjp.at/doc/rfc/rfc6438.html.

Chen, E., et al., "Outbound Route Filtering Capability for BGP-4," Network Working Group, RFC 5291, Aug. 2008, 12 pages; http://www.hjp.at/doc/rfc/rfc5291.html.

Lapukhov, "Scaling MPLS networks," INE, Mar. 24, 2015, 15 pages; http://blog.ine.com/2010/08/16/scaling-mpls-networks/.

Marques, P., et al., "Dissemination of Flow Specification Rules," Network Working Group, RFC 5575, Aug. 2009, 22 pages.

Raszuk, R., et al., "BGP vector Routing," Network Working Group, Oct. 27, 2014, 12 pages; https://tools.ietf.org/html/draft-patel-raszuk-bgp-vector-routing-04.

Rekhter, Y., et al., "A Border Gateway Protocol 4 (BGP-4)," Network Working Group, RFC 4271, Jan. 2006, 104 pages; https://tools.ietf.org/html/rfc4271.

Rosen, E., et al., "BGP/MPLS IP Virtual Private Networks (VPNs)," Network Working Group, RFC 4364, Feb. 2006, 47 pages; https://tools.ietf.org/html/rfc4364.

"3GPP TS 29.212 V13.1.0 (Mar. 2015) Technical Specification: $3^{rd}$ Generation Partnership Project; Technical Specification Group Core Network and Terminals; Policy and Chargig Control (PCC); Reference points (Release 13)," $3^{rd}$ Generation Partnership Project (3GPP), 650 Route des Lucioles—Sophia Antipolis Valbonne—France, Mar. 2015; 230 pages.

"ETSI TS 132 251 V12.7.0 (Oct. 2014) Technical Specification: Digital cellular telecommunications system (Phase 2+); Universal Mobile Telecommunications System (UMTS); LTE; Telecommunication management; Charging management; Packet Switched (PS) domain charging (3GPP TS 32.251 version 12.7.0 Release 12)," European Telecommunications Standards Institute (ETSI), 650 Route des Lucioles, F-06921 Sophia Antipolis Cedex—France, Oct. 2014; 164 pages.

Amazon Web Services, "Amazon Simple Workflow Service Developer Guide," API Version, Jan. 25, 2012, 175 pages http://aws.amazon.com/documentation/swf/.

Amir, et al., "An Active Service Framework and its Application to Real-time Multimedia Transcoding," in Proc. ACM SIGCOMM Conference {SIGCOMM '98}, Sep. 1998, 12 pages.

(56) References Cited

OTHER PUBLICATIONS

Bouthors, N.P., et al., "Metadata Transport in SFC," Network Working Group draft-bouthors-sfc-md-oo.txt, Sep. 19, 2014; 22 pages.
Cisco Systems, Inc., "Cisco vPath and vServices Reference Guide for Intercloud Fabric," Apr. 19, 2015, 48 pages http://www.cisco.com/c/en/us/td/docs/switches/datacenter/vsg/sw_vsg_ic/5_2_1_IC_2_2_1/vpath_vservices/reference/guide/vpath_vservices_reference.pdf.
Cisco Systems, Inc., "Call Flows for Dual-Stack PMIPv6 and GTP," Intelligent Wireless Access Gateway Configuration Guide, first published on or about Feb. 27, 2014; 14 pages.
Cisco Systems, Inc., "Cisco Quantum Services Platform," first published on or about Mar. 25, 2014; 2 pages.
Cisco Systems, Inc., "Radius Attribute 8 (Framed-IP-Address) in Access Requests," Sep. 8, 2009; 8 pages.
Cisco Systems, Inc., "Radius Vendor-Specific Attributes (VSA)," Cisco IOS Security Configuration Guide, first published on or about Sep. 13, 2014; 10 pages.
U.S. Appl. No. 14/746,919, filed Jun. 23, 2015, entitled "Mobile Service Routing in a Network Environment," Inventor(s): Muhammad A. Khan, et al.
U.S. Appl. No. 14/717,887, filed May 20, 2015, entitled "System and Method to Facilitate the Assignment of Service Functions for Service Chains in a Network Environment," Inventor(s): Robert M. Batz, et al.
U.S. Appl. No. 14/728,010, filed Jun. 2, 2015, entitled "System and Method to Facilitate the Assignment of Service Functions for Service Chains in a Network Environment," Inventors: Robert M. Batz et al.
Brown, Gabriel, "Designing 5G-Ready Mobile Core Networks," White Paper, Heavy Reading, Sep. 2016; 14 pages.
Sayeed, Akbar M., "Millimeter-Wave MIMO Architectures for 5G Gigabit Wireless," GLOBECOM Workshop on Emerging Technologies for 5G Wireless Cellular Networks, Dec. 8, 2014; 37 pages.
"Stream Control Transmission Protocol," from Wikipedia, the free encyclopedia, Oct. 11, 2016, 8 pages.
"LTE Quick Reference, IDs in LTE," ShareTechnote Handbook, first published on or about Jul. 13, 2012; 13 pages.
Ghodsi, Ali, et al., "Information-Centric Networking: Seeing the Forest for the Trees," Hotnets 2011, Nov. 14-15, 2011, Cambridge, MA; 6 pages.
"Information-centric networking," from Wikipedia, the free encyclopedia, Oct. 19, 2016; 2 pages.
"ETSI GS NFV-MAN 001 V1.1.1 (Dec. 2014) Group Specification: Network Functions Virtualisation (NFV); Management and Orchestration," ETSI, 650 Route des Lucioles, F-06921 Sophia Antipols Cedex—France, Dec. 2014; 184 pages.
4G Americas, "Executive Summary—Inside 3GPP Release 13: Understanding the Standards for HSPA+ and LTE-Advanced Enhancements," Sep. 2015, 9 pages.
"3GPP TS 23.008 V14.0.0 (Dec. 2016) Technical Specification: 3rd Generation Partnership Project; Technical Specification Group Core Network and Terminals; Organization of subscriber data (Release 14)," 3GPP, 650 Route des Lucioles—Sophia Antipolis Valbonne—France, Dec. 2016; 131 pages.
"3GPP TS 23.122 V14.1.0 (Dec. 2016) Technical Specification: 3rd Generation Partnership Project; Technical Specification Group Core Network and Terminals; Non-Access-Stratum (NAS) functions related to Mobile Station (MS) in idle mode (Release 14)," 3GPP, 650 Route des Lucioles—Sophia Antipolis, Valbonne—France, Dec. 2016; 50 pages.
"3GPP TS 23.236 V13.0.0 (Jun. 2015) Technical Specification: 3rd Generation Partnership Project; Technical Specification Group Services and System Aspects; Intra-domain connection of Radio Access Network (RAN) nodes to multiple Core Network (CN) nodes (Release 13)," 3GPP, 650 Route des Lucioles—Sophia Antipolis, Valbonne—France, Jun. 2015; 41 pages.
"3GPP TS 23.236 V14.0.0 (Sep. 2016) Technical Specification: 3rd Generation Partnership Project; Technical Specification Group Services and System Aspects; Intra-domain connection of Radio Access Network (RAN) nodes to multiple Core Network (CN) nodes (Release 14)," 3GPP, 650 Route des Lucioles—Sophia Antipolis, Valbonne—France, Sep. 2016; 41 pages.
"3GPP TS 23.401 V13.8.0 (Sep. 2016) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis, Valbonne—France, Sep. 2016; 374 pages.
"3GPP TR 23.711 V14.0.0 (Sep. 2016) Technical Report: 3rd Generation Partnership Project; Technical Specification Group Services and System Aspects; Enhancements of Dedicated Core networks selection mechanism (Release 14)," 3GPP, 650 Route des Lucioles—Sophia Antipolis, Valbonne France, Sep. 2016; 36 pages.
"3GPP TR 23.799 V0.2.0 (Feb. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Feb. 2016; 17 pages.
"3GPP TR 23.799 V0.3.0 (Mar. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Mar. 2016; 52 pages.
"3GPP TR 23.799 V0.4.0 (Apr. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Apr. 2016; 96 pages.
"3GPP TR 23.799 V0.5.0 (May 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, May 2016; 178 pages.
"3GPP TR 23.799 V0.6.0 (Jul. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Jul. 2016; 321 pages.
"3GPP TR 23.799 V0.7.0 (Aug. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Aug. 2016; 323 pages.
"3GPP TR 23.799 V0.8.0 (Sep. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Sep. 2016; 423 pages.
"3GPP TR 23.799 V1.0.0 (Sep. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Sep. 2016; 423 pages.
"3GPP TR 23.799 V1.0.1 (Sep. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Sep. 2016; 423 pages.
"3GPP TR 23.799 V1.0.2 (Sep. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Sep. 2016; 423 pages.
"3GPP TR 23.799 V1.1.0 (Oct. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis, Valbonne—France, Oct. 2016; 501 pages.
"3GPP TR 23.924 V13.0.0 (Dec. 2015) Technical Report: 3rd Generation Partnership Project; Technical Specification Group Ser-

(56) References Cited

OTHER PUBLICATIONS vices and System Aspects; Feasibility study on Non-Access Stratum (NAS) node selection function above Base Station Controller (BSC)/Radio Network Controller (RNC) (Release 13)," 3GPP, 650 Route des Lucioles—Sophia Antipolis, Valbonne—France, Dec. 2015; 41 pages.
"3GPP TS 29.274 V14.2.0 (Dec. 2016) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control Plane (GTPv2-C); Stage 3 (Release 14)," 3GPP, 650 Route des Lucioles—Sophia Antipolis, Valbonne—France, Dec. 2016; 369 pages.
"3GPP TS 36.331 V13.3.0 (Sep. 2016) Technical Specification: 3rd Generation Partnership Project; Technical Specification Group Radio Access Network; Evolved Universal Terrestrial Radio Access (E-UTRA); Radio Resource Control (RRC); Protocol specification (Release 13)," 3GPP, 650 Route des Lucioles—Sophia Antipolis, Valbonne—France, Sep. 2016; 627 pages.
"3GPP TS 36.331 V14.1.0 (Dec. 2016) Technical Specification: 3rd Generation Partnership Project; Technical Specification Group Radio Access Network; Evolved Universal Terrestrial Radio Access (E-UTRA); Radio Resource Control (RRC); Protocol specification (Release 13)," 3GPP, 650 Route des Lucioles—Sophia Antipolis, Valbonne—France, Dec. 2016; 654 pages.
"3GPP TS 36.413 V14.1.0 (Jan. 2017) Technical Specification: 3rd Generation Partnership Project; Technical Specification Group Radio Access Network; Evolved Universal Terrestrial Radio Access Network (E-UTRAN); S1 Application Protocol (S1AP) (Release 14)," 3GPP, 650 Route des Lucioles—Sophia Antipolis, Valbonne—France, Jan. 2017; 333 pages.
"3GPP TR 38.801 V0.4.0 (Aug. 2016) Technical Report Technical Report: 3rd Generation Partnership Project; Technical Specification Group Radio Access Network; Study on New Radio Access Technology; Radio Access Architecture and Interfaces (Releases 14)," 3GPP, 650 Route des Lucioles—Sophia Antipolis, Valbonne—France, Aug. 2016.
3GPP TSG-RAN WG3 Meeting #93bis, Document No. R3-162416, entitled "On Common and Specific Building Blocks for Inactive UEs," Source: Ericsson, Sophia Antipolis, France, Oct. 10-14, 2016; 7 pages.
SA WG2 Meeting #114, SA WG2 Temporary Document No. S2162010, entitled "NextGen Core Architecture solution for sharing Network Function across multiple Network Slices," Source: ZTE, Sophia Antipolis, Apr. 11-15, 2016; 8 pages.
"ATIS-I-0000046: Emerging Opportunities for Leveraging Network Intelligence," ATIS, Oct. 2014; 45 pages.
Balduini, M., et al., "Stream Reasoning for Linked Data," International Semantic Web Conference ISWC 2013, Sydney, Australia, Oct. 21-25, 2013 31 pages.
Bertsekas, Prof. Dimitri P., "Session 1813 Traffic Behavior and Queueing in a QoS Environment," Networking Tutorials, OPNetwork 2002, Washington, DC, Aug. 2002; 90 pages.
Bierman, A., "Restconf Protocol," Network Working Group Internet-Draft, draft-ietf-netconf-restconf-10, Mar. 16, 2016; 116 pages.
Bjorklund, M., et al., "Yang—A Data Modeling Language for the Network Configuration Protocol (NETCONF)," Internet Engineering Task Force RFC 6020, Oct. 2010; 173 pages.
Brockners, F., et al., "Data Formats for In-band OAM," Network Working Group Internet-Draft, draft-brockners-inband-oam-data-00, Jul. 8, 2016; 14 pages.
Brockners, F., et al., "Encapsulations for In-band OAM Data," Network Working Group Internet-Draft, draft-brockners-inband-oam-transport-00, Jul. 8, 2016; 14 pages.
Brockners, F., et al., "Proof of Transit," Network Working Group Internet-Draft, draft-brockners-proof-of-transit-00, Jul. 8, 2016; 19 pages.
Brockners, F., et al., "Requirements for In-band OAM," Network Working Group Internet-Draft, draft-brockners-inband-oam-requirements-oo, Jul. 8, 2016; 18 pages.
Brockners, Frank, et al., "Containers on Routers and Switches: Run your apps and tools natively on Cisco boxes," Cisco LIVE! Berlin, Germany, Feb. 15-19, 2016; 113 pages.
Brockners, Frank, et al., "Next-gen Network Telemetry: Trip-recording and Service Chain/Path Verification for all Traffic," Cisco LIVE! Berlin, Germany, Feb. 15-19, 2016; 88 pages.
Browne, R., et al., "Network Service Header Timestamping," Network Working Group Internet Draft, draft-browne-sfc-nsh-timestamp-00.txt, Dec. 4, 2015; 19 pages.
Cisco Systems, Inc., "Cisco IOS Flexible NetFlow Technology," Data Sheet, Dec. 2008; 5 pages.
Vishwanath, Arun, et al., "How Poisson is TCP Traffic at Short Time-Scales in a Small Buffer Core Network?" Ants'09 3rd international conference on Advanced Networks and Telecommunication Systems, New Delhi, India, Dec. 2009; 3 pages.
Claise, B., et al., "Specification of the IP Flow Information Export (IPFIX) Protocol for the Exchange of Flow Information," Internet Engineering Task Force RFC 7011; Sep. 2013; 76 pages.
Clark, Joe, "Playing with your Traffic: Exploring the Software-Defined Packet Control Within the IETF," Cisco LIVE! Berlin, Germany, Feb. 15-19, 2016; 91 pages.
Desaunay, Laurent, "Operation & Management Transition with the Adoption of an SDN Architecture and NFV Concepts," Cisco LIVE! Berlin, Germany, Feb. 15-19, 2016; 43 pages.
"ETSI GS NFV 002 V1.2.1 (Dec. 2014) Group Specification: Network Functions Virtualisation (NFV); Architectural Framework," ETSI, 650 Route des Lucioles, F-06921 Sophia Antipols Cedex—France; Dec. 2014; 21 pages.
"ETSI GS NFV-Rel 004 V1.1.1 (Apr. 2016) Group Specification: Network Functions Virtualisation (NFV); Assurance; Report on Active Monitoring and Failure Detection," ETSI, 650 Route des Lucioles, F-06921 Sophia Antipols Cedex—France; Apr. 2016; 61 pages.
Guichard, J., et al., "Network Service Header (NSH) Context Header Allocation (Data Center)," Service Function Chaining Internet-Draft, draft-guichard-sfc-nsh-dc-allocation-04, Feb. 15, 2016; 8 pages.
Halpern et al., "Service Function Chaining (SFC) Architecture," RFC 7665, Oct. 2015.
"Little's law," from Wikipedia, the free encyclopedia, Apr. 17, 2016; 5 pages.
"M/D/1 queue," from Wikipedia, the free encyclopedia, May 16, 2016; 6 pages.
Quinn, et al., "Problem Statement for Service Function Chaining," RFC 7498, Apr. 2015.
"Tutorial on Stream Reasoning for Linked Data at ISWC 2013," International Semantic Web Conference 2013, Sydney, Australia, Oct. 2013.
"Verizon Network Infrastructure Planning: SDN-NFV Reference Architecture, Version 1.0," Verizon Wireless, Inc., Feb. 2016; 220 pages.
Virtamo, J., "Poisson process," 38.3143 Queueing Theory/Poisson process, first published on or about Apr. 23, 2006; 19 pages.
3GPP TR 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9), 3rd Generation Partnership Project (3GPP), 650 Route des Lucioles—Sophia Antipolis Valbonne—France, Jun. 2010; 259 pages.
3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13), 3GPP, 650 Route des Lucioles—Sophia Antipolis Valbonne—France, Dec. 2015.
"3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Valbonne—France, Sep. 2005; 30 pages.
"3GPP TS 23.203 V8.9.0 (Mar. 2010) Technical Specification: Group Services and System Aspects; Policy and Charging Control

(56) References Cited

OTHER PUBLICATIONS

Architecture (Release 8)," 3rd Generation Partnership Project (3GPP), 650 Route des Lucioles—Sophia Antipolis Valbonne—France, Mar. 2010; 116 pages.
"ETSI TS-123-401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," © European Telecommunication Standards Institute 2010; Jun. 2010, 261 pages.
"ETSI TS-129-212 V9.5.0 (Jan. 2011) Technical Specification: Universal Mobile Telecommunications System (UMTS); LTE; Policy and charging control over Gx reference point (3GPP TS 29.212 version 9.5.0 Release 9)," © European Telecommunication Standards Institute 2011; Jan. 2011,120 pages.
ETSI TS 129 212 V13.4.0 (Jan. 2016) Technical Specification: Universal Mobile Telecommunications System (UMTS); LTE; Policy and Charging Control (PCC); Reference points (3GPP TS 29.212 version 13.4.0 Release 13), European Telecommunications Standards Institute (ETSI), 650 Route des Lucioles, F-06921 Sophia Antipolis Cedex—France, Jan. 2016; 249 pages.
"ETSI TS-136-401 V8.6.0 (Jul. 2009) Technical Specification: LTE; Evolved Universal Terrestrial Radio Access Network (E-UTRAN); Architecture description (EGPP TS 36.401 version 8.60 Release 8)," © European Telecommunication Standards Institute 2009; Jul. 2009, 21 pages.
"ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.
Bhatia, M., et al., "Bidirectional Forwarding Detection (BFD) on Link Aggregation Group (LAG) Interfaces," Internet Engineering Task Force RFC 7130, Feb. 2014; 11 pages.
Bitar, et al., "Interface to the Routing System (I2RS) for Service Chaining: Use Cases and Requirements," draft-bitar-i2rs-service-chaining-00.txt; Internet Engineering Task Force, IETF Standard Working Draft; Jul. 15, 2013; 30 pages.
Bosch, et al., "Telco Clouds and Virtual Telco: Consolidation, Convergence, and Beyond", May 23-27, 2011, Proceedings of 2011 IFIP/IEEE International Symposium on Integrated Network Management (IM), Dublin, 7 pages.
Boucadair et al., "Differentiated Service Function Chaining Framework," Network Working Group Internet Draft draft-boucadair-network-function-chaining-03, Aug. 21, 2013.
Boucadair, et al., "Analysis of Potential Solutions for Revealing a Host Identifier (HOST_ID) in Shared Address Deployments," Internet Engineering Task Force (IETF), RFC 6967, Jun. 2013, 24 pages; http://tools.ietf.org/pdf/rfc6967.pdf.
Cao, Z., "Data Plane Processing Acceleration Framework," Internet Engineering Task Force Internet Draft, draft-cao-dataplane-acceleration-framework-o1, Jul. 4, 2014; 10 pages.
Carmes, "Delivering Data Plane Acceleratin for ETSI's NFV PoC," SDxC Central, Jan. 16, 2014; 8 pages.
"CEA-708," from Wikipedia, the free encyclopedia, Nov. 15, 2012; 16 pages.
Chaloupka, Jiri, "NFV Pro Poskytovatele Sluzeb," Tech SP2, Cisco Connect, Praha, Ceska republika; Mar. 24-25, 2015; 114 pages.
"Cisco Nexus 1000V Series Switches," Cisco Systems, Inc., Jul. 2013; 3 pages.
"Cisco vPath and vServices Overview," Chapter 1, Cisco vPath and vServices Reference Guide, OL-27702-02, Oct. 19, 2012; 10 pages.
Cisco Systems, Inc., "Chapter 11: Virtual Routing and Forwarding," Cisco Active Network Abstraction 3.7 Reference Guide, Feb. 1, 2010, 7 pages.
Cisco Systems, Inc., Vmware, Inc., "Joint Cisco and Vmware Solution for Optimizing Virtual Desktop Delivery," Sep. 2008.
"Digital Program Insertion," from Wikipedia, the free encyclopedia, Jan. 2, 2012; 1 page.

Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.
"Dynamic Adaptive Streaming over HTTP," from Wikipedia, the free encyclopedia, Oct. 25, 2012; 3 pages.
EPO Oct. 6, 2015 Extended Search Report and Written Opinion from European Application Serial No. 15160159.8.
Fang et al., "BGP IP BPN Virtual PE; draft-fang-13vpn-virtual-pe-02," Internet Engineering Task Force, Apr. 7, 2013; 26 pages.
Fernando et al., "Virtual Topologies for Service Chaining in BGP IP VPNs; draft-rfernando-13vpn-service-chaining-01," Internet Engineering Task Force, Feb. 25, 2013; 16 pages.
Freier, et al., "The Secure Sockets Layer (SSL) Protocol Version 3.0," Internet Engineering Task Force (IETF), RFC 6101, Aug. 2011, 67 pages; http://tools.ietf.org/pdf/rfc6101.pdf.
"G-Streamer and in-band Metadata," from RidgeRun Developer Connection, Jun. 19, 2012; 5 pages.
Gray, et al., "Leases: An Efficient Fault-Tolerant Mechanism for Distributed File Cache Consistency," Proceedings of the Twelfth ACM Ssymposium on Operating Systems Principles, New York, NY (Dec. 3-6, 1989), 9 pages; http://www.stanford.edu/class/cs240/readings/89-leases.pdf.
Han, Bo, et al. "Network function virtualization: Challenges and opportunities for innovations." Communications Magazine, IEEE 53.2 (Feb. 2015): 90-97.
Higgins, Tim, "How We Test SPI+NAP Routers," SmallNetBuilder, Oct. 18, 2002; 5 pages.
"How do switches, vSwitches and distributed vSwitches differ? Getting Vmware terminology straight," TechTarget, Jun. 11, 2013; 4 pages.
"IEEE Standard for the Functional Architecture of Next Generation Service Overlay Networks, IEEE Std. 1903-2011," IEEE, Piscataway, NJ, Oct. 7, 2011; 147 pages.
"ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.
"Interim report: Subscriber Aware SGi/Gi-LAN Virtualization," ConteXtream, ETSI, Jul. 24, 2014; 16 pages.
Ip infusion™, "A Redundant Architecture for Routing Protocols," White Paper, Jun. 2002, XP002240009, 8 pages; www.ipinfusion.com/pdf/WP_Redundancy_rev0602.pdf.
Jeff Pang, Distributed Hash Tables< 2004, 33 pages; http://www.cs.cmu.edu/~dga/15-744/S07/lectures/16-dht.pdf.
Jiang, et al., "An Architecture of Service Function Chaining," IETF Network Working Group Internet Draft, draft-jiang-sfc-arch-01.txt, Feb. 14, 2014; 12 pages.
Katz, D., "Bidirectional Forwarding Detection (BFD)," Internet Engineering Task Force RFC 5880, Jun. 2010; 49 pages.
Kim, et al., "Floodless in SEATTLE: A Scalable Ethernet Architecture for Large Enterprises," Computer Communication Review, Oct. 2008, 14 pages; http://www.cs.princeton.edu/~chkim/Research/SEATTLE/seattle.pdf.
Kumar, S., et al., "Service Function Path Optimization: draft-kumar-sfc-sfp-optimization-00.txt," Internet Engineering Task Force, IETF; Standard Working Draft, May 10, 2014.
Lampson, "How to Build a Highly Available System Using Consensus," Proceedings of the 10th International Workshop on Distributed Algorithms (Oct. 1996), 17 pages; http://research.microsoft.com/en-us/um/people/blampson/58-Consensus/Acrobat.pdf.
"Lawful interception," Wikipedia, the free encyclopedia, Nov. 17, 2015; 7 pages.
Lesniewski-Laas, et al., "SSL splitting: securely serving data from untrusted caches," Laboratory for Computer Science, Massachusetts Institute of Technology, First published on or about Aug. 30, 2008, 13 pages; http://pdos.csail.mit.edu/papers/ssl-splitting-usenixsecurity03.pdf.
Mackie, B., et al., "Service Function Chains Using Virtual Networking," draft-mackie-sfc-using-virtual-networking-o2.txt; Internet Engineering Task Force, IETF Standard Working Draft, Oct. 17, 2013; 44 pages.

(56) References Cited

OTHER PUBLICATIONS

"M-PEG 2 Transmission," © Dr. Gorry Fairhurst, 9 pages [Published on or about Jan. 12, 2012] http://www.erg.abdn.ac.uk/future-net/digital-video/mpeg2-trans.html.
"MPEG Transport Stream," from Wikipedia, the free encyclopedia, Nov. 11, 2012; 7 pages.
"NFV ISG PoC Proposal: SDN Enabled Virtual EPC Gateway," ETSI, NFV World Congress San Jose, May 5-7, 2015; 7 pages.
Netmanias, "LTE QoS: SDF and EPS Bearer QoS," Netmanias: Analyze Trends, Technologies and Market, Sep. 11, 2013; 18 pages.
PCT Mar. 10, 2009 International Preliminary Report on Patentability from International Application No. PCT/IB05/01013, 5 pages.
PCT Jan. 2, 2013 International Search Report and Written Opinion from International Application Serial No. PCT/US2012/048764; 14 pages.
PCT Nov. 10, 2014 International Search Report from International Application No. PCT/US2014/036907; 3 pages.
PCT Jun. 24, 2014 International Preliminary Report on Patentability from International Application No. PCT/US2012/048674; 8 pages.
PCT Jun. 26, 2014 International Preliminary Report on Patentability from International Application PCT/US2012/067502.
PCT Jan. 19, 2015 International Search Report and Written Opinion from International Application Serial No. PCT/US2014/062244.
PCT Mar. 16, 2015 International Search Report and Written Opinion from International Application No. PCT/US2014/066629.
PCT Aug. 20, 2015 International Search Report and Written Opinion from International Application Serial No. PCT/US2015/020242; 12 pages.
PCT—Jun. 30, 2008 International Search Report and Written Opinion from International Application No. PCT/IB05/01013, 5 pages.
PCT—Apr. 4, 2013 International Search Report and Written Opinion from International Application No. PCT/US2012/067502 11 pages.
Quinn, et al., "Network Service Header," Network Working Group Internet Draft draft-quinn-nsh-01, Jul. 12, 2013.
Quinn, P., et al., "Network Service Header," Network Working Group Internet-Draft draft-quinn-sfc-nsh-02.txt, Feb. 14, 2014, 21 pages.
Quinn, P., et al., "Network Service Header," Networking Working Group Internet Draft draft-quinn-nsh-00.txt, Jun. 13, 2013, 20 pages.
Quinn, P., et al., "Service Function Chaining (SFC) Architecture," IETF Standard Working Draft draft-quinn-sfc-arch-05.txt; May 5, 2014, 31 pages.
"Realising the Benefits of Network Functions Virtualisation in Telecoms Networks," Intel Corporation, White Paper, First published on or about Apr. 20, 2015.
Rescorla, "Introduction to Distributed Hash Tables," Proceedings of the sixty-seventh Internet Engineering Task Force, IAB Plenary, Nov. 5-10, 2006, San Diego, CA, 39 pages; http://www.ietf.org/proceedings/65/slides/plenaryt-2.pdf.
Rosen, E., et al., "MPLS Label Stack Encoding," Network Working Group RFC 3032, Jan. 2001; 23 pages.
Salaets, Bart, "Advanced Traffic Steering & Optimization Technologies," MENOG 2014, Mar. 30, 2015, XP055214882 http://www.menog.org/presentations/menog-14/272-Advanced_Traffic_Steering_v04.pdf.
Salisbury, Brent, "The Control Plane, Data Plane and Forwarding Plane in Networks," NetworkStatic: Brent Salisbury's Blog, Sep. 27, 2012; 6 pages.
Salsano, S., et al., "Generalized Virtual Networking: an enabler for Service Centric Networking and Network Function Virtualization", 16th International Telecommunications Network Strategy and Planning Symposium, Networks 2014, Sep. 17-19, 2014, Funchal, Portugal (pdf on arXiv) (slides: pptx pdf SlideShare) http://netgroup.uniroma2.it/people/faculties/stefano-salsano/stefano-salsano-publications-list/.
Snell, "HTTP/2.0 Discussion: Binary Optimized Header Encoding," Network Working Group, Internet Draft, Expires Aug. 22, 2013, Feb. 18, 2013, 8 pages; http://tools.ietf.org/pdf/draft-snell-httpbis-keynego-02.pdf.
"Virtual Gi-LAN and EPC to Create and Deploy Services Faster," Intel Corporation, Solution Brief, Software-based Network Solutions; Copyright © 2015 Intel Corporation. All rights reserved; 6 pages.
"Virtual Solutions for your NFV Environment," F5 Networks Solution Center, first published on or about Feb. 2, 2016; 12 pages.
"What is the difference between the Data Link Layer and the Network Layer in the OSI Model?" Yahoo Answers; Dec. 14, 2008; 2 pages.
Williams, et al., et al., "Overlay Path Option for IP and TCP," Network Working Group, Internet Draft, Expires Dec. 21, 2013, Jun. 19, 2013, 17 pages; http://tools.ietf.org/pdf/draft-williams-overlaypath-ip-tcp-rfc 04.pdf.
Wolf, K.H., "VPP: Virtual Presence Protocol," Internet Draft, draft-wolf-vpp-01.txt, Jul. 5, 1999; 46 pages.
Wong, F., et al., "SMPTE-TT Embedded in ID3 for HTTP Live Streaming, draft-smpte-id3-http-live-streaming-00," Informational Internet Draft, Jun. 2012; 7 pages.
Wu, et al., "Resilient and efficient load balancing in distributed hash tables," Journal of Network and Computer Applications 32 (Jan. 2009), 16 pages; http://sist.sysu.edu.cn/~dwu/papers/jnca09-lb.pdf.
Yavatkar, R., et al., "A Framework for Policy-Based Admission Control," Network Working Group, RFC 2753, Jan. 2000; 21 pages.
Yourtchenko, et al., "Revealing hosts sharing an IP address using TCP option," Network Working Group, Internet Draft, Expires Jun. 10, 2012, Dec. 8, 2011, 10 pages; http://tools.ietf.org/pdf/draft-wing-nat-reveal-option-03.pdf.
U.S. Appl. No. 15/171,892, filed Jun. 2, 2016, entitled "System and Method for Hosting Mobile Packet Core and Value-Added Services Using a Software Defined Network and Service Chains," Inventor(s): Hendrikus G.P. Bosch, et al.
U.S. Appl. No. 15/252,028, filed Aug. 30, 2016, entitled "System and Method for Managing Chained Services in a Network Environment," Inventor(s): Hendrikus G.P. Bosch, et al.
Alizadeh, Mohammad, et al., "CONGA: Distributed Congestion-Aware Load Balancing for Datacenters," SIGCOMM '14, Aug. 17-22, 2014, 12 pages.
Author Unknown, "OpenNebula 4.6 User Guide," Jun. 12, 2014, opennebula.org, 87 pages.
Author Unknown, "Service-Aware Network Architecture Based on SDN, NFV, and Network Intelligence," 2014, 8 pages.
Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.
Bremler-Barr, Anat, et al., "Deep Packet Inspection as a Service," CoNEXT '14, Dec. 2-5, 2014, pp. 271-282.
Cisco Systems, Inc. "Cisco VN-LINK: Virtualization-Aware Networking," 2009, 9 pages.
Farrel, A., et al., "A Path Computation Element (PCE)—Based Architecture," RFC 4655, Network Working Group, Aug. 2006, 40 pages.
Katsikas, Goergios P., et al., "Profiling and accelerating commodity NFV service chains with SCC," The Journal of Systems and Software, vol. 127, Jan. 2017, pp. 12-27.
Kumbhare, Abhijit, et al., "Opendaylight Service Function Chaining Use-Cases," Oct. 14, 2014, 25 pages.
Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.
Newman, David, "Review: FireEye fights off multi-stage malware," Network World, May 5, 2014, 7 pages.
Quinn, P., et al., "Network Service Header," Network Working Group, Mar. 24, 2015, 42 pages; https://tools.ietf.org/pdf/draft-ietf-sfc-nsh-00.pdf.
Quinn, P., et al., "Network Service Chaining Problem Statement," draft-quinn-nsc-problem-statement-03.txt, Aug. 26, 2013, 18 pages.

(56) References Cited

OTHER PUBLICATIONS

Quinn, Paul, et al., "Service Function Chaining: Creating a Service Plane via Network Service Headers," IEEE Computer Society, 2014, pp. 38-44.

First Office Action and Search Report from the China National Intellectual Property Administration, dated Jul. 1, 2019, 8 pages, for the corresponding Chinese Patent Application No. 201580062531.6.

* cited by examiner

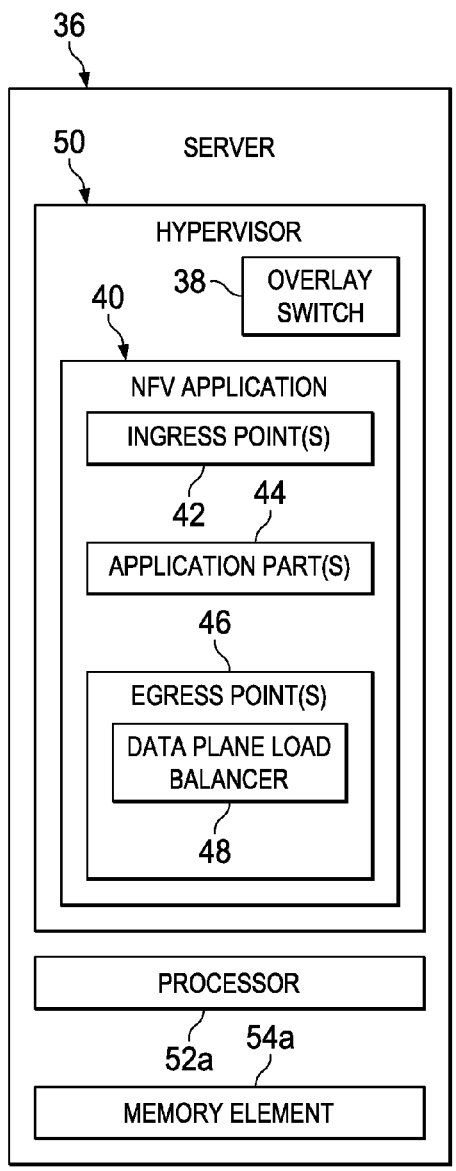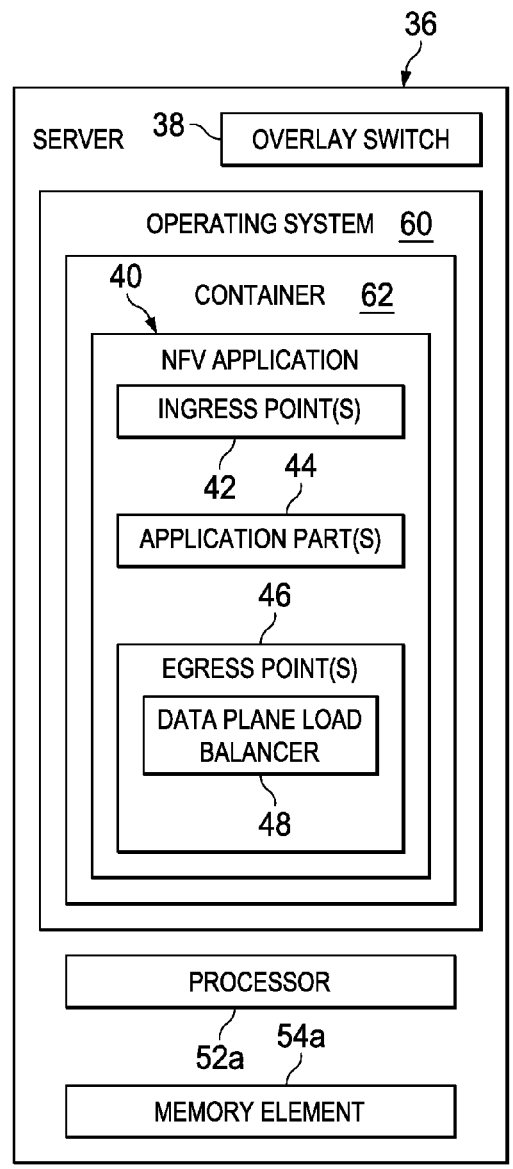
FIG. 1B
FIG. 1C

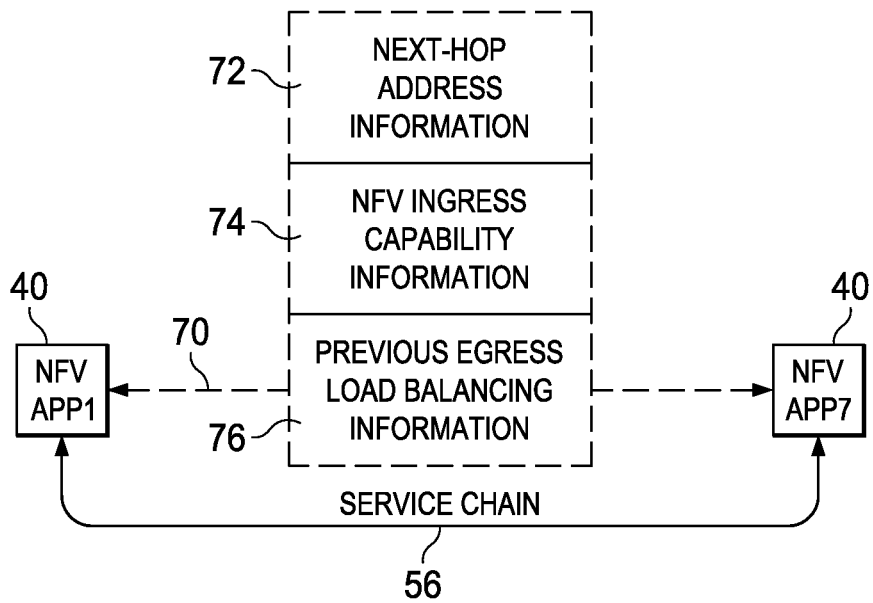
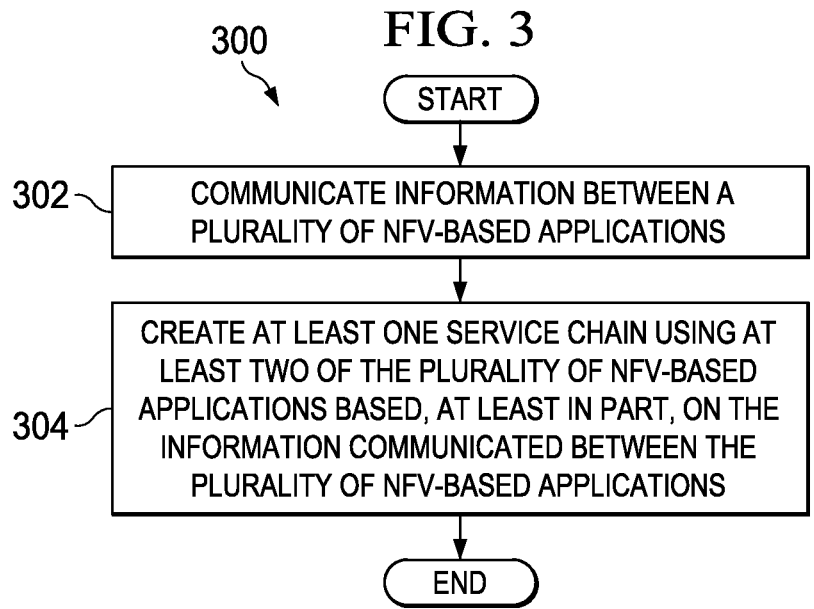

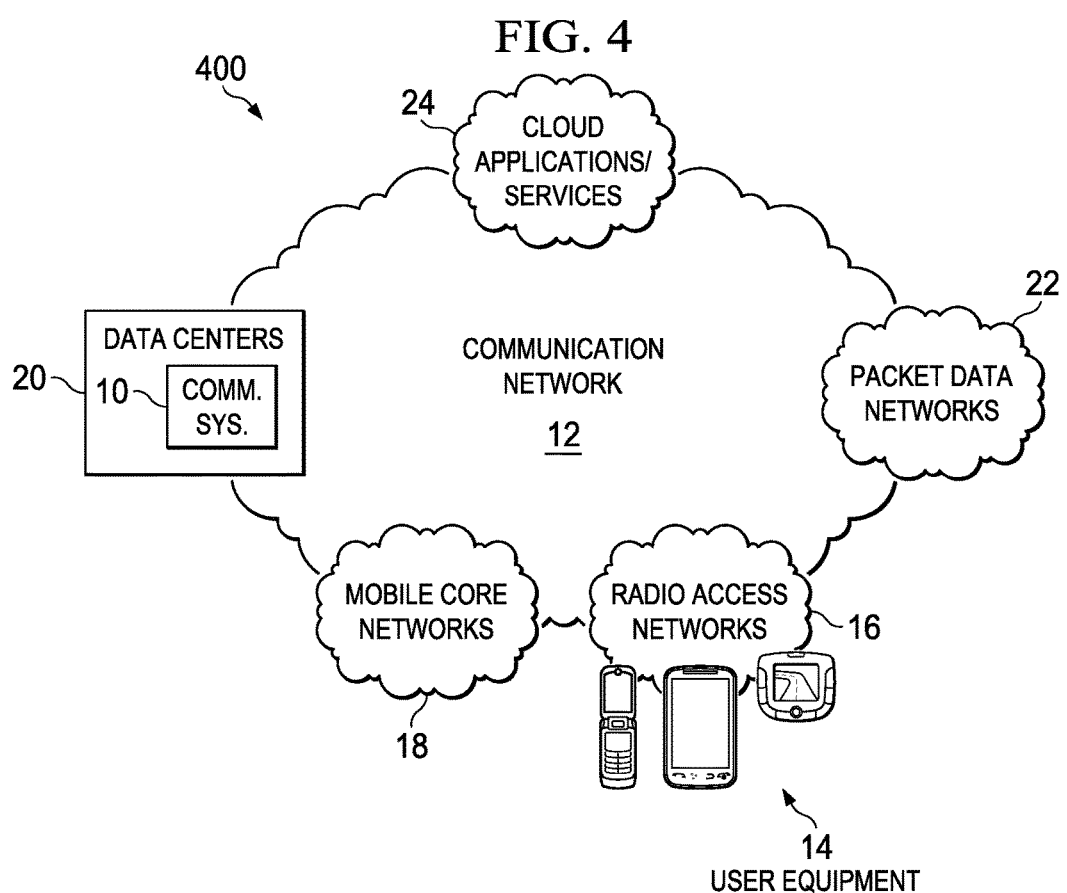

SYSTEM AND METHOD TO CHAIN DISTRIBUTED APPLICATIONS IN A NETWORK ENVIRONMENT

CROSS-REFERENCE TO RELATED APPLICATION

This application claims the benefit of priority under 35 U.S.C. § 119(e) to U.S. Provisional Application Ser. No. 62/081,457, entitled "SYSTEM AND METHOD TO CHAIN DISTRIBUTED APPLICATIONS IN A NETWORK ENVIRONMENT" filed Nov. 18, 2014, which is hereby incorporated by reference in its entirety.

TECHNICAL FIELD

This disclosure relates in general to the field of communications and, more particularly, to a system and method to chain distributed applications in a network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services while minimizing the potential for overloads of links between network elements. A properly planned and operating data center network provides application and data integrity while optimizing application and service availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1B is a simplified block diagram illustrating example details associated with a server according to one embodiment of the communication system;

FIG. 1C is a simplified block diagram illustrating other example details associated with a server according to one embodiment of the communication system;

FIG. 2 is a simplified block diagram illustrating example details associated with interactions for chaining distributed applications in accordance with an embodiment of the communication system;

FIG. 3 is a simplified flow diagram illustrating example operations associated with chaining distributed applications in a network environment in accordance with one of embodiment of the communication system; and FIG. 4 is a simplified block diagram illustrating an example details associated with a data center including the communication system in accordance with one embodiment of the present disclosure.

DETAILED DESCRIPTION OF EXAMPLE EMBODIMENTS

Overview

Figure 1A:
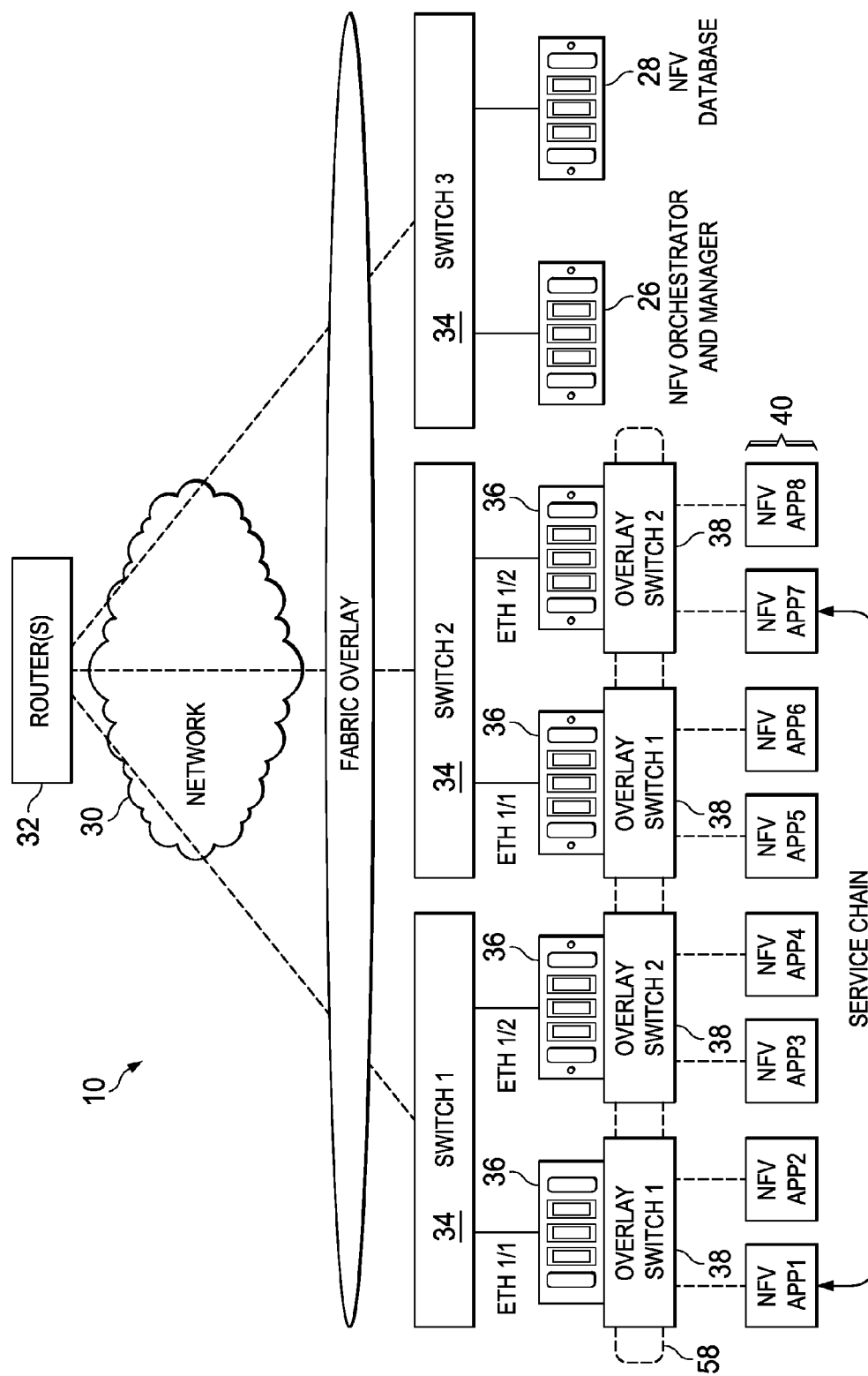
FIG. 1A is a simplified block diagram illustrating a communication system to facilitate chaining distributed applications in a network environment according to one embodiment of the present disclosure.

A method is provided in one example embodiment and may include communicating information between a plurality of network function virtualized (NFV) based applications; and creating at least one service chain using at least two of the plurality of NFV-based applications based, at least in part, on the information communicated between the plurality NFV based applications. In some instances, the information can be communicated using border gateway protocol (BGP) exchanges between the plurality of NFV-based applications.

In some instances the information can include next-hop address information for one or more ingress points of a particular NFV-based application. In other instances, the information can include one or more capabilities by which a particular NFV-based application can receive data on one or more ingress points. In yet other instances, the information can include a method by which one or more egress points of a previous NFV-based application in a particular service chain is to perform load balancing for a subsequent NFV-based application in the particular service chain.

In some cases, each of the plurality of NFV-based applications can include a data plane load balancer embedded at one or more egress points. In other cases, a particular NFV-based application can include functionality associated with mobile core applications. In still other cases, a particular NFV-based application can include functionality associated with a Gi-LAN virtual service area.

Example Embodiments

As used herein, the terms 'network function virtualized (NFV)-based application', 'NFV application' and 'virtual machine' encompass an emulation of a computer system, operating based on the computer architecture and functions of a real or hypothetical computer, with particular implementations involving specialized hardware, software, or a combination of both. An NFV-based application or virtual machine may execute via a hypervisor-based virtualization or a container-based virtualization of a server (e.g., blade server, rack server, stand-alone server) using the server's hardware (e.g., processor and memory element) and/or operating system. In various embodiments, an NFV-based application, NFV application, or virtual machine can be configured to carry out one or more network functions, which can be chained together to create one or more service chains.

Turning to FIG. 1A, FIG. 1A is a simplified block diagram illustrating a communication system 10 to facilitate chaining distributed applications in a network environment according to one embodiment of the present disclosure. FIG. 1A illustrates a network 30 comprising a plurality of switches and routers, for example, one or more router(s) 32 and one or more switch(es) 34. Router(s) 32 and switch(es) 34 may comprise identical or similar network elements and may differ merely in the nature of devices attached to their respective ports: whereas router(s) 32 connect with switch(es) 34 on their respective ports, a plurality of servers 36 may be connected to switches 34 on their respective ports. In various embodiments, network 30 may implemented in a data center.

Each server 36 may host one or more Network Function Virtualized (NFV) based applications 40. In general, NFV-based applications 40 can be networked and distributed applications that can be configured to perform various telecommunication functions. Note the term 'NFV-based application' may also be referred to more generally using the term 'NFV application' throughout this Specification.

Each server 36 may be configured with overlay or underlay software network switches, for example, an overlay switch 38 that forms part of a distributed overlay switch 58 across network 30. As shown, each overlay switch 38 enables NFV applications 40 to connect to network 30 through any suitable overlay or underlay software network architectures, such as, for example FabricPath, virtual Extensible Local Area Network (VXLAN), Transparent Interconnection of Lots of Links (TRILL) overlay, Network Service Header (NSH) [as prescribed by the Internet Engineering Task Force (IETF) NSH working group], differentiated services code point (DSCP) markings, combinations thereof or the like. In various embodiments, overlay switches 38 may operate in a virtual machine (VM), in a container and/or in a host kernel (e.g., via each server 36). A central NFV orchestrator and manager 26 enables configuration and instantiation of NFV applications 40 and overlay switches 38 for connectivity in network 30 for service chains, such as, for example, a service chain 56 shown in FIG. 1A. In general, service chains (e.g., service chain 56) of NFV applications 40 may be provided to facilitate unique and customizable services to one or more nodes in communication system 10. A node may be any electronic device (e.g., UE 14), client, server, peer, service application, access point name (APN) or other object capable of sending, receiving, or forwarding information over communications channels in a network. A NFV database 28 may include information pertaining to NFV applications 40, which are described in further detail in FIG. 1B.

FIG. 1B illustrate example details of a given server 36 according to a certain embodiment of the present disclosure. In at least one embodiment, server 36 may include overlay switch 38 and a given NFV application 40 instantiated in a hypervisor 50 in server 36. Sever 36 may include a memory element 52a and a processor 54a to facilitate the chaining operations described herein.

Each NFV application 40 is comprised of three stages: one or more ingress point(s) 42 at which packets can be received from either an external network or a preceding NFV-capable application (e.g., another NFV application 40); one or more application part(s) 44 potentially maintained in a service chain, such as service chain 56; and one or more egress point(s) 46 at which packets can be transmitted to the signaled next application's ingress or an external network. A data plane load balancer 48 can be embedded in egress point(s) 46.

Each of the stages has a specific role or function in a packet processing pipeline (e.g., service chain 56). In various embodiments, NFV applications 40 may combine these functions in aggregate functions, and some of the NFV applications may keep these functions separate. In various embodiments NFV applications 40 may split these functions onto individual virtual machines (not shown) instantiated in servers 36. The software/functional decomposition of NFV applications is an ongoing study area within the European Telecommunications Standards Institute (ETSI) NFV Working Group.

FIG. 1C illustrates other example details of a given server 36 according to a certain embodiment of the present disclosure. In particular, FIG. 1C illustrates NFV application 40 virtualized in container-based environment. In at least one embodiment, server 36 may include overlay switch 38 and a given NFV application 40 virtualized in a container 62 of an operating system 60 for server 36. Sever 36 may further include memory element 52a and processor 54a to facilitate the chaining operations described herein. NFV application 40 can include ingress point(s) 42, application part(s) 44 and egress point(s) 46. Data plane load balancer 48 can be embedded in egress point(s) 46. Accordingly, the system and method provided by communication system 10 can provide for different virtualization architectures in order to facilitate chaining distributed applications in a network environment.

For purposes of illustrating the techniques of communication system 10, it is important to understand NFV-based applications as generally operated in commercial architectures. The following foundational information may be viewed as a basis from which the present disclosure may be properly explained. Such information is offered earnestly for purposes of explanation only and, accordingly, should not be construed in any way to limit the broad scope of the present disclosure and its potential applications. As noted previously, NFV-based applications are networked and distributed applications that may perform telecommunications functions, such as, for example, line termination and policy enforcement functions.

Within the telecommunications industry, there is an ongoing effort to commoditize and standardize telco applications and host these applications in data centers. The reason for this "virtualization" is the desire by operators to reduce both operational and capital expenditures by standardizing common hardware and software.

One key consideration for the telecommunications industry is the ability to mix and match "telco" applications from many different application manufacturers. Mobile and non-mobile service providers typically obtain subcomponents, or "applications", of their "telco" solutions from many different manufacturers for a variety of reasons, such as, but not limited to, risk and vendor management. Service providers prefer to obtain the "best of breed" solutions from a set of manufacturers and combine the parts into their specific solution to address their specific business needs. Risk mitigation plays an important role here to avoid a service provider to be locked into the solutions of a single manufacturer.

Thus, there exists a need for "universal glue" between the individual NFV-based components that are hosted in data centers. This glue can enable the creation of a combined "virtualized telco" solution comprised of one or more NFV-based applications hosted in one or more data centers. To tie together a set of NFV-based applications to form service chains, a method is needed where the egress point(s) of one of these "telco" NFV applications can directly and efficiently route traffic to the appropriate ingress point(s) of a subsequent application. It should be recognized that given that NFV-based applications are inherently distributed in nature, each of the applications potentially has many ingress and egress points or locations.

As network traffic is routed between egress point(s) of one NFV-application and ingress point(s) of the next NFV-application, there is likely to be an impedance mismatch. Performance on each NFV-application is based on a number of factors, including, but not limited to instance size, software efficiency, software function, etc., which often results in numerous internal and external load distribution methods being employed to manage network traffic between NFV applications. It should also be noted that ingress point(s) may be provided by hardware load balancers, and egress point(s) may also route packets outside the data center. It should also be further noted that the ingress and egress locations may be either layer-2 (L2) adjacent or layer-3 (L3) adjacent.

All NFV-based applications are to be hosted in data centers, yet, given that these NFV-based applications are running in network-challenged data center locations, such as, for example, the data center servers, it is important to consider efficient if not optimal routing between applications. The server blades in a data center are typically connected by way of a 1-10 gigabit per second (Gb/s) Ethernet link to one or more top-of-rack (ToR) switches, end-of-row (EoR) switches and the data center router. The links between EoR, ToR and servers are considered at risk for overload since these links are configured with statistical multiplexing in mind to optimize data center expenditures. This means that egress point(s) of one application can connect to ingress point(s) of another application through these potentially oversubscribed links.

However, if external load balancers are used, a mechanism to automate the provisioning of the load balancer is required. A generic mechanism to add functions to a load balancer pool does not exist today. This elasticity requirement thus implies that from an application connectivity perspective, a method is needed that dynamically tracks ingress points as these are also created dynamically. While a data-plane load balancer can potentially be built for NFV-based applications, doing so would (1) lead to aggregation of traffic and thus potential bottlenecks, (2) to address such a bottleneck, it would imply building a special-purpose data-plane load balancer close to the data-center router and thus (3) inefficient use networking resources in a data center and (4) inefficient use of Wide Area Network (WAN) resources when NFV-based applications exist across multiple data centers.

Communication system 10 is configured to address these issues (and others) in offering a system and method for chaining distributed applications in a network environment. The methods described herein may be executed by respective hardware processors of servers 36 in network 12. In general, communication system 10 provides a system and method to host distributed NFV applications 40 in a service chain (e.g., service chain 56) by way of leaking routes between routed areas and to "steer" all traffic between these routed areas through service applications. In embodiments described herein, communication system 10 may provide a system and method by which one distributed NFV-based application can signal another distributed NFV-based application of (1) a method by which the connectivity between NFV-applications can be established, (2) the method of signaling by which one NFV-based application can provide data-plane load distribution for the next application, (3) a method whereby one NFV-based application can share intimate application details with the next and (4) the method by which dynamic changes can be signaled to previous applications. Additionally, the procedures can also be used to signal external routing sources of connectivity into a data center including communication system 10. One or more service chain(s) 56 may serve as the primary method for providing connection distributed, data-center hosted, networked applications in data centers with distributed routes. Note NFV-based applications 40 in a service chain may be referred to as "hops" herein in this Specification.

More specifically, such distributed NFV applications 40 can signal connectivity between ingress point(s) 42 and egress point(s) 46 using a routing protocol, such as for example, Border Gateway Protocol (BGP) [as defined in RFC 4271 and RFC 4364], application-specific routing information beneficial for applications further in the chain. This construct can then be used to route traffic between multiple, independently operating, NFV-capable applications in data centers and cloud infrastructures. In various embodiments, routing techniques can include tunneling over Multi-Protocol Label Switching in Internet Protocol (MPLS-in-IP), Network Service Header (NSH) tunneling and Equal Cost Multipath Routing (ECMP) based load balancing, combinations thereof or the like. Communication system 10 may provide NSH endpoints of ingress points of NFV applications 40 to be signaled through the BGP protocol (referred to herein as a BGP/NSH interconnection) in addition to more traditional methods such as MPLS, MPLS-over-IP, General Routing Encapsulation (GRE), GPRS Tunneling Protocol (GTP) encapsulation, VXLAN or others. Overloading risks for links within communication system 10 are addressed by providing distributed data plane load balancer 48 directly embedded in the egress point(s) 46 of NFV applications 40.

BGP generally announces routable addresses and next hop information to all interested parties. Typically, a BGP speaker maintains a mesh of connections and floods all routers in a network with network routing information. During operation, communication system 10 may provide a similar technique in network 30 (e.g., within a data center) to create service chain 56 of NFV-based applications 40. For example, as shown in FIG. 1A, (first) NFV application (NFV App1) and (seventh) NFV application (NFV App7) may be chained together to form service chain 56. It should be noted the order and number of NFV applications 40 for service chain 56 is shown for illustrative purposes only and is not meant to limit the broad scope of the many possibilities that may be configured for chaining together NFV applications 40 to form service chains.

In various embodiments, NFV applications 40 may announce, via BGP:

1) One or more next-hop addresses of NFV-based application routers, (e.g., ingress point(s) of a subsequent NFV application);

2) The capabilities by which an NFV-based application can receive data on ingress point(s). In various embodiments, these capabilities can include the tunneling techniques used (e.g. NSH-based tunneling, encrypted tunnel, or more traditional information) and, if needed, additional application-specific parameters such that one application can "help" the next application(s) to perform better (e.g., subscriber information, or other contextual information); and/or 3) The method by which a previous hop's egress is to perform load balancing. For instance, ECMP and/or 5-tuple route leaking (e.g., source IP, destination IP, source port, destination port, protocol) are examples by which a previous hop's egress can make a next hop selection and BGP can be used to instruct the previous hop of parameters that are needed for ECMP (e.g., hashing technique, number of bins, "leg" (e.g., each ECMP load balanced endpoint), etc.). Further, in some instances where contextual information is already stored at the NFV-application, generic decisions on load distribution may not be made, but instead may additional require "stickiness" parameters. In various embodiments, "stickiness" parameters (e.g., source IP, destination IP, 5-tuple, subscriber information, etc.) can also be communicated. It should be noted that egress load balancing is distinct from load balancing at the ingress, as is typically used for Web based application architectures.

In at least one embodiment, NFV-based applications 40 can include, but not be limited to, virtual complex mobile core applications. In at least one embodiment, NFV-based applications 40 can be associated with a Gi-LAN virtual service area and/or a service platform. It should be understood, however, that NFV-based applications 40, as described in the present disclosure do not need to adhere to any specific configuration of such functions.

While the connectivity between NFV applications 40 can be established by way of BGP, it should be recognized that this connectivity may lead to imperfect results. It should be understood, therefore that within BGP, convergence of routes may not be immediate, and that previous hops may send data to incorrect next hops. It is assumed in certain embodiments described herein that NFV-based applications 40 can route packet flows internally to address these imperfections.

Typically in an NFV-based environment, traffic is sent bi-directionally. Care should be taken that load balancing decisions in the forward link are reversible for return traffic. Firewall load balancing techniques have been used in the past to accomplish this, but obviating the need for a forward-path load balancer also obviates the need for a reverse-path load balancer. Also, in case next hops fail, it should be understood that application-specific routing on egress removes routing opportunities accordingly.

In some instances where failures result in loss of contextual information in a next-hop NFV Application, generic failover rules may not be applied. In these instances, multiple decisions may result, including the dis-association of all flows destined to the failed NFV-application instance. The scenarios and implications of contextual loss during failure are outside scope of the present disclosure. In terms of establishing adjacency between applications, embodiments disclosed herein assume provisioning to take place between NFV applications 40 to exchange BGP signaling end-points and/or the establishment of NFV-based route reflection. Without restraining the solution, output-route filtering (ORF) as described in RFC 5291 may be applied.

In essence, the communication system 10 offers a system and method for connecting NFV-based applications 40, which can be hosted in a data center, such that efficient and potentially even optimal routing can take place between such NFV applications 40 given the constraints of data-center designs. Although solutions provided by communication system 10 may use standard BGP for establishing connectivity, specific additions can be provided for signaling application-specific parameters and load-balancing procedures. Various advantages provided by using BGP in such environments may include: (1) it is an open standard, (2) it has shown to be resilient against partial failures in networks, (3) it can provide efficient and optimal routes, and (4) it can be extended to support application-specific messaging that can be useful for NFV-based applications 40.

Note that the number of switches, servers, NFV applications, virtual machines, service chains and other elements of communication system 10 shown in the FIGURE is merely for ease of illustration, and is not intended to be limiting in any sense. Any number of such and other elements may be included within communication system 10 within the broad scope of the embodiments.

In at least one embodiment, NFV database 28 can comprise a standalone server or a local configuration storage in switches 34 and/or in servers 36 that maps each server 36 to the configurations, hop addresses, capabilities, etc. of its instantiated NFV applications 40 and any corresponding service chains (e.g., service chain 56). Routers 32 and switches 34 comprise hardware switches configured to forward packets in a network environment. In at least one embodiment, distributed overlay switch 58 comprises overlay switches 38 with separate instances on each of a hypervisor of servers 36 in network 30. Each instance of overlay switch 38 may comprise packet forwarders, virtual ports, and other virtual switch components instantiated and executing in servers 36 (e.g., in a VM, container or kernel) and may perform Layer 2 (L2) switching and advanced networking functions, such as applying quality of service (QoS) settings, access control lists, etc. on inbound and outbound traffic. In at least one embodiment, NFV orchestrator and manager 26 comprises an application executing in a suitable server or other network element in network 30 to facilitate instantiation and maintenance of NFV applications 40 and one or more service chain(s) 56. In at least one embodiment, each server 36 can include a corresponding NFV orchestrator and manager 26 for NFV applications instantiated on a corresponding server. In at least one embodiment, NFV orchestrator and manager 26 enables configuring and managing virtualization hosts, networking, and storage resources in a virtualized data center environment, for example, to create and deploy NFV-based applications 40 and services to private clouds.

Turning to the infrastructure of communication system 10, the network topology can include any number of servers, virtual machines, switches (including distributed overlay switches), routers, and other nodes inter-connected to form a large and complex network. A node may be any electronic device, client, server, peer, service, application, or other object capable of sending, receiving, or forwarding information over communications channels in a network. Elements of FIG. 1A may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1A do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1A is simplified for ease of illustration.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), Asynchronous Transfer Mode (ATM), fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Turning to FIG. 2, FIG. 2 is a simplified block diagram illustrating interactions between NFV applications 40 for service chain 56 according to one embodiment of communication system 10. FIG. 2 illustrates communication interactions 70 between each NFV application 40 (e.g., NFV App1 and NFV App7), which can be used to create service chain 56. In various embodiments, communication interactions 70 may include NFV applications 40 communicating using BGP as a signaling mechanism to set up ECMP for load balancing purposes. In at least one embodiment, communication interactions 70 may be exchanged not only between NFV applications 40 but also other elements of network 30 and/or external networks. It should be noted that the order of NFV applications 40 in service chain 56 should not be construed to indicate an order of operations for service chain 56, but rather is provided for illustrating various features of communication system 10. As shown in FIG. 2, communication interactions 70 may include next-hop address information 72, NFV ingress capability information 74 and previous egress load balancing information 76 for each NFV application 40 (e.g., NFV App1 and NFV App7).

In various embodiments, next-hop address information 72 can include address information for ingress point(s) 42 for each NFV application 40. In various embodiments, NFV ingress capability information 74 can include the tunneling techniques used (e.g. NSH-based tunneling, encrypted tunnel, or more traditional information) and, if needed, additional application-specific parameters such that one application can "help" the next application(s) to perform better (e.g., DPI information, subscriber information, or other contextual information). In various embodiments, previous egress load balancing information 76 can include the method by which a previous hop's egress is to perform load balancing. For instance, ECMP is an example by which a previous hop's egress can make a next hop selection and BGP can be used to instruct the previous hop of parameters that are needed for ECMP (e.g., hashing technique, number of bins, "leg", etc.) and "stickiness" parameters (e.g., source IP, destination IP, 5-tuple, subscriber information, etc.).

It should be understood that the number of NFV applications included in a service chain can vary, depending on configuration. The number of NFV applications shown in service chain 56 is provided for illustrative purposes and is not meant to limit the broad scope of the teachings of the present disclosure.

Turning to FIG. 3, FIG. 3 is a simplified flow diagram illustrating example operations 300 associated with chaining distributed applications in a network environment in accordance with one embodiment of communication system 10. In various embodiments, operations 300 can be performed using one of more NFV based applications (e.g., any of NFV based applications 40).

At any time, a service chain can be formed using NFV-based applications. At 302, the operations can include communicating information between a plurality of NFV-based applications. At 304, the operations can include creating at least one service chain using at least two of the plurality of NFV-based applications based, at least in part, on the information communicated between the plurality of NFV-based applications and the operations may end. In various embodiments, the information can be communicated using BGP exchanges between the plurality of NFV-based applications.

In at least one embodiment, the information can include next-hop address information for one or more ingress points of a particular NFV-based application. In certain embodiments, the information can include one or more capabilities by which by which a particular NFV-based application can receive data on one or more ingress points. In various embodiments, the information can also include a method by which one or more egress points of a previous NFV-based application in a particular service chain is to perform load balancing for a subsequent NFV-based application in the particular service chain.

Turning to FIG. 4, FIG. 4 is a simplified block diagram 400 illustrating example details associated with an example use case in which communication system 10 is provided in data centers 20. As shown in FIG. 4, an example communication network 12 may include users operating user equipment (UE) 14, one or more radio access networks (RANs) 16, one or more mobile core networks 18, one or more data centers 20 (each including communication system 10), one or more packet data networks 22 and one or more cloud applications/services 24.

Each of the elements of communication network 12 may communicate and/or exchange information through simple interfaces or through any other suitable connection (wired or wireless), which provides a viable pathway for network communications. Additionally, any one or more of these elements may be combined or removed from the architecture based on particular configuration needs. For example, communication network 12 may include a configuration capable of TCP/IP communications for the transmission or reception of packets in a network. Communication network 12 may also operate in conjunction with a user datagram protocol/IP (UDP/IP) or any other suitable protocol where appropriate and based on particular needs.

In various embodiments, RANs 16 can include 3rd Generation Partnership Project (3GPP) access networks and non 3GPP access networks. In various embodiments, 3GPP access networks can include legacy access networks such as Global System for Mobile communications (GSM) Enhanced Data rates for GSM Evolution (EDGE) Radio Access Network (GERAN), Universal Mobile Telecommunications System (UMTS) Terrestrial Radio Access Network (UTRAN), generally referred to as 3G, and/or Long Term Evolution (LTE) access networks such as Evolved UTRAN (E-UTRAN), generally referred to as 4G/LTE/LTE-Advanced (LTE-A). In various embodiments, non-3GPP access networks can include, but not be limited to digital subscriber line (DSL), Cable, WLAN (e.g., WiMAX, WiFi) or the Internet.

In at least one embodiment, UE 14 is a mobile device having multi-mode capabilities and is able to simultaneously communicate using one or more mobile wireless connections such as 2G/3G/4G/LTE/LTE-A connections and/or one or more wireless LAN (WLAN) connections such as WiFi and/or Worldwide Interoperability for Microwave Access (WiMAX), Bluetooth™, combinations thereof or the like. In accordance with various embodiments, UE 14 can be associated with clients or customers wishing to initiate a flow in communication network 12 via some network. The terms 'user equipment', 'mobile node', 'end user', 'and 'subscriber' are inclusive of devices used to initiate a communication, such as a computer, a personal digital assistant (PDA), a laptop or electronic notebook, a cellular telephone, an i-Phone®, i-Pad®, a Google® Droid® phone, an IP phone, or any other device, component, element, or object capable of initiating voice, audio, video, media, or data exchanges within communication network 12 using multiple access technologies.

UE 14 may also be inclusive of a suitable interface to the human user such as a microphone, a display, a keyboard, or other terminal equipment. UE 14 may also be any device that seeks to initiate a communication on behalf of another entity or element such as a program, a database, or any other component, device, element, or object capable of initiating an exchange within communication network 12. Data, as used herein in this document, refers to any type of numeric, voice, video, media, or script data, or any type of source or object code, or any other suitable information in any appropriate format that may be communicated from one point to another. In certain embodiments, UE 14 may have a bundled subscription for network access and application services (e.g., data, voice over LTE (VoLTE), etc.).

In at least one embodiment mobile core networks 18 can include one or more elements comprising an Evolved Packet Core (e.g., Mobility Management Entities (MMEs), serving gateways (SGWs), packet data network (PDN) gateways (PGWs), etc.) to support the transmission and/or exchange of information and/or data between UE 14 (communicating via RANs 16) and data centers 20, packet data networks 22 and/or cloud applications/services 24. In various embodiments, packet data networks 22 can include the Internet, service provider IP services, combinations thereof or the like. In certain embodiments, policy and charging services and applications can be included in mobile core networks 18, data centers 20 (including communication system 10), cloud applications/services 24 and/or packet data networks 22.

As shown in FIG. 4, data centers 20 can be provided with communication system 10. Referring to communication system 10, in one example implementation, routers 32, switches 34, servers 36 and NFV orchestrator and manager 26 are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate the operations described herein. In other embodiments, these operations and/or features may be provided external to these elements, or included in some other network device to achieve this intended functionality. Alternatively, one or more of these elements can include software (or reciprocating software) that can coordinate in order to achieve the operations and activities outlined herein.

Note that in this Specification, references to various features (e.g., elements, structures, modules, components, steps, operations, characteristics, etc.) included in 'one embodiment', 'example embodiment', 'an embodiment', 'another embodiment', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that an 'application', an 'NFV application' and/or an 'NFV-based application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, servers 36 (including NFV applications 40). In some embodiments, one or more of these features may be implemented in hardware, provided external to these elements, or consolidated in any appropriate manner to achieve the intended functionality. The various network elements (e.g., servers 36 (including NFV applications 40), NFV orchestrator and manager 26, switches 34, routers 32) may include software (or reciprocating software) that can coordinate in order to achieve the operations as outlined herein. In still other embodiments, these elements may include any suitable algorithms, hardware, software, components, modules, interfaces, or objects that facilitate the operations thereof. This may be inclusive of appropriate algorithms and communication protocols that allow for the effective exchange of data or information.

Furthermore, servers 36 (including NFV applications 40) described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 52a) can store data used for the operations described herein. This includes the memory element being able to store instructions (e.g., software, logic, code, etc.) in non-transitory media, such that the instructions are executed to carry out the activities described in this Specification. A processor, including a hardware processor, can execute any type of instructions associated with the data to achieve the operations detailed herein in this Specification. In one example, hardware processors (e.g., processor 54a) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), a digital signal processor (DSP), an application specific integrated circuit (ASIC) that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed by a hardware processor of a server in a network environment, comprising:
    communicating information between a first network function virtualized (NFV)-based application and a second NFV-based application, wherein the information comprises load balancing information communicated from the second NFV-based application to the first NFV-based application that identifies a load balancing method that the first NFV-based application is to use to load balance traffic communicated from one or more egress points of the first NFV-based application to one of a plurality of ingress points of the second NFV-based application and one or more load balancing parameters associated with the load balancing method that the first NFV-based application is to use to load balance the traffic; and
    creating at least one service chain using the first NFV-based application and the second NFV-based application based, at least in part, on the information communicated between the first NFV-based application and the second NFV-based application;
    wherein the first and second NFV applications emulate computer systems.

2. The method of claim 1, wherein the information is communicated using border gateway protocol (BGP) exchanges between the first NFV-based application and the second NFV-based application.

3. The method of claim 1, wherein the information includes next-hop address information for each of the plurality in ingress points of the second NFV-based application.

4. The method of claim 1, wherein the information further comprises one or more capabilities by which the second NFV-based application can receive data at the plurality of ingress points.

5. The method of claim 1, wherein the first NFV-based application includes a data plane load balancer embedded at the one or more points.

6. The method of claim 1, wherein at least one of the first NFV-based application and the second NFV-based application includes functionality associated with mobile core applications.

7. The method of claim 1, wherein at least one of the first NFV-based application and the second NFV-based application includes functionality associated with a Gi-LAN virtual service area.

8. The method of claim 1, wherein the one or more load balancing parameters identify one or more Equal Cost Multipath (ECMP) load balancing parameters for ECMP load balancing that the first NFV-based application is to use to load balance the traffic communicated to one of the plurality of ingress points of the second NFV-based application.

9. One or more non-transitory tangible media encoding logic that includes instructions for execution by a processor wherein the execution causes the processor to perform operations, comprising:

communicating information between a first network function virtualized (NFV)-based application and a second NFV-based application, wherein the information comprises load balancing information communication from the second NFV-based application to the first NFV-based application that identifies a load balancing method that the first NFV-based application is to use to load balance traffic communicated from one or more egress points of the first NFV-based application to one of a plurality of ingress points of the second NFV-based application and one or more load balancing parameters associated with the load balancing method that the first NFV-based application is to use to load balance the traffic; and creating at least one service chain using the first NFV-based application and the second NFV-based application based, at least in part, on the information communication between the first NFV-based application and the second NFV-based application;

wherein the first and second NFV applications emulate computer systems.

10. The media of claim 9, wherein the information is communicated using border gateway protocol (BGP) exchanges between the first NFV-based application and the second NFV-based application.

11. The media of claim 9, wherein the information further comprises next-hop address information for each of the plurality of ingress points of the second NFV-based application.

12. The media of claim 9, wherein the information further comprises one or more capabilities by which the second NFV-based application can receive at the plurality of ingress points.

13. The media of claim 9, wherein the first NFV-based application includes a data plane load balancer embedded at one or more egress points.

14. The media of claim 9, wherein at least one of the first NFV-based application and the second NFV-based application includes functionality associated with mobile core applications.

15. An apparatus, comprising:
a memory element for storing data; and
a processor for executing instructions associated with the data, wherein the executing causes the apparatus to perform operations, comprising:

communicating information between a first network function virtualized (NFV)-based application and a second NFV-based application; wherein the information comprises load balancing information communicated from the second NFV-based application to the first NFV-based application that identifies a load balancing method that the first NFV-based application is to use to load balance traffic communicated from one or more egress points of the first NFV-based application to one of a plurality of ingress points of the second NFV-based application and one or more load balancing parameters associated with the load balancing method that the first NFV-based application is to use to load balance the traffic; and creating at least one service chain using the first NFV-based application and the second NFV-based application based, at least in part, on the information communicated between the first NFV-based application and the second NFV-based application;

wherein the first and second NFV applications emulate computer systems.

16. The apparatus of claim 15, wherein the information is communicated using border gateway protocol (BGP) exchanges between the first NFV-based application and the second NFV-based application.

17. The apparatus of claim 15, wherein the information includes at least one of:
next-hop address information for each of the plurality of ingress points of the second NFV-based application; and
one or more capabilities by which the second NFV-based application can receive data at the plurality of ingress points.

18. The apparatus of claim 15, wherein the first NFV-based application includes a data plane load balancer embedded at one or more egress points.

19. The apparatus of claim 15, wherein one of the first NFV-based application and the second NFV-based application includes functionality associated with a Gi-LAN virtual service area.

* * * * *